US006719935B2

(12) United States Patent
Tunc

(10) Patent No.: US 6,719,935 B2
(45) Date of Patent: Apr. 13, 2004

(54) PROCESS FOR FORMING BIOABSORBABLE IMPLANTS

(75) Inventor: Deger Tunc, East Brunswick, NJ (US)

(73) Assignee: Howmedica Osteonics Corp., Allendale, NJ (US)

(*) Notice: Subject to any disclaimer, the term of this patent is extended or adjusted under 35 U.S.C. 154(b) by 188 days.

(21) Appl. No.: 09/754,935

(22) Filed: Jan. 5, 2001

(65) Prior Publication Data
US 2002/0125595 A1 Sep. 12, 2002

(51) Int. Cl.$^7$ ................................................ B29C 47/78
(52) U.S. Cl. ............... 264/40.7; 264/178 R; 264/235.6; 264/342 RE
(58) Field of Search .................. 264/40.1, 40.7, 264/177.17, 178 R, 210.1, 235.6, 288.4, 342 RE

(56) References Cited

U.S. PATENT DOCUMENTS

| | | | |
|---|---|---|---|
| 3,463,158 A | 8/1969 | Schmitt et al. | 128/334 |
| 3,531,561 A | 9/1970 | Trehu | 264/210 |
| 3,636,956 A | 1/1972 | Schneider | 128/335.5 |
| 3,739,773 A | 6/1973 | Schmitt et al. | 128/92 |
| 3,797,499 A | 3/1974 | Schneider | 128/334 |
| 4,209,476 A * | 6/1980 | Harris | 264/40.4 |
| 4,279,249 A | 7/1981 | Vert et al. | 128/92 |
| 4,539,981 A | 9/1985 | Tunc | 128/92 |
| 4,550,449 A | 11/1985 | Tunc | 623/16 |
| 4,898,186 A | 2/1990 | Ikada et al. | 606/62 |
| 4,968,317 A | 11/1990 | Törmälä et al. | 606/77 |
| 5,122,315 A * | 6/1992 | Darley | 264/40.1 |
| 5,227,412 A | 7/1993 | Hyon et al. | 523/105 |
| 5,294,395 A * | 3/1994 | Broyer | 264/178 F |
| 5,626,811 A * | 5/1997 | Liu | 264/210.7 |
| 5,718,716 A * | 2/1998 | Goddard et al. | 606/230 |
| 5,997,568 A * | 12/1999 | Liu | 606/228 |
| 6,093,200 A | 7/2000 | Liu et al. | |
| 6,165,202 A | 12/2000 | Kokish et al. | |
| 6,235,869 B1 * | 5/2001 | Roby et al. | 528/354 |
| 6,287,499 B1 * | 9/2001 | Roby et al. | 264/210.5 |

FOREIGN PATENT DOCUMENTS

EP 0 321 176 A2 6/1989

OTHER PUBLICATIONS

J. C. Middleton and A. J. Tipton, "Synthetic Biodegradable Polymers as Medical Devices", Medical Plastics and Biomaterials Magazine, Mar. 1998.*

* cited by examiner

Primary Examiner—Mark Eashoo
(74) Attorney, Agent, or Firm—Lerner, David, Littenberg, Krumholz & Mentlik, LLP

(57) ABSTRACT

A process for forming a rod of bioabsorbable polymeric material includes extruding the material at a temperature above its melting point at a controlled rate of between 0.4 to 20 feet per minute to form a continuous rod. The continuous rod is then cooled by passing the rod through a cooling bath to cause nucleation. The continuous rod is passed through a first puller running at least at the same speed as the extruder. A second puller is provided which is moving faster than the first puller so that the continuous rod is elongated at a ratio of between 2 and 12 times. During this elongation, the rod is heated to a temperature of between 55° C. and 140° C. in an oven located between the first and second pullers. The rod is annealed at a temperature of between 70° C. and 110° C. after being elongated but prior to exiting the second puller. Upon exiting the second puller, the tension in the rod is released and the continuous rod is then allowed to cool. A cutting station is then provided to cut the continuous rod into desired lengths.

42 Claims, 1 Drawing Sheet

PROCESS FOR FORMING BIOABSORBABLE IMPLANTS

BACKGROUND OF THE INVENTION

The invention relates to a process for forming bioresorbable rods, pins, screws made of resorbable polymeric material such as polylactides and polyglycolides. More particularly, it relates to a continuous process for forming a rod, strip, tape or bar, which continuous rod, strip, tape or bar is cut into segments so that resorbable meshes, plates, pins, medullary rods, and screws maybe manufactured therefrom.

Various processes have been proposed to form bioresorbable or bioabsorbable thermoplastic rods, pins, screws and plates for use in orthopedics. These processes are either "batch" or continuous "processes". A batch process is performed on preformed molded bodies whereas a continuous process makes strips, tape, bar or rods in a continuous manner. Continuous processes were first used to manufacture resorbable sutures. Such processes such as melt-processing or spinning are taught in U.S. Pat. Nos. 3,636,956 and 3,797,499. Melt-processing consists of melting in an extruder and extruding the material as a filament and then stretching the filament for orientation of the polymer chains. Melt-spinning is a term of art describing this process where absorbable sutures made of copolymers of L-lactide and/or glycolide are continuously extruded to form suture filaments which were then drawn at temperatures of between 50° C. and 140° C. at draw ratios up to 11 and then annealed.

U.S. Pat. Nos. 3,463,158 and 3,739,773 also relate to continuous processes for forming absorbable implants made of polyglycolic acid. As in U.S. Pat. Nos. 3,636,956 and 3,797,499, a melt spinning process is used to form filaments which are then drawn at about 55° C. to five times their original length. The diameter of these filaments may easily be increased to form self-supporting members or rods.

A continuous process for forming rods is also shown in European Patent Application EP 0 321 176 A2. This patent application relates to a continuous process and as shown in FIG. 4 thereof, a polylactic acid rod is continuously extruded and cooled and then drawn at a temperature above its glass transition temperature with tension being maintained on the polymer rod during cooling.

Various patents relate to a batch process in which a rod or bar is formed by molding, such as injection molding, and then later drawn to orient the polymer chains and strengthen the article. Such a process is disclosed in Ikada et al. patent 4,898,186, in which a poly-L-lactide shaped body is formed in a mold and is then axially drawn about 2 to 10 times at a temperature of 70° C. to about 120° C. Ikada et al. U.S. Pat. No. 5,227,412 also relates to a batch method in which molded articles are oriented after molding. A similar process is taught in Tormala et al. U.S. Pat. No. 4,968,317 in which poly-L-lactide rods are made by injection molding and then drawn at a draw ratio of 7 at temperatures up to 40° below the melting point of the polymer. All of the processes taught by the batch method patents suffer from low production rates, since each molded rod is individually heated and then drawn to orient the molecular chains.

It has been found that the continuous process of forming bioabsorbable rods, strips or tapes, while more productive than the molded process, was difficult to implement because the cross-section of the extrusion was difficult to control. This is the result of the extrusion process in which polymer granules are fed from a hopper into an extruder where they are heated and melted and then extruded usually by a screw. The flow rate from the hopper into the melting area of the extruder and then into the screw, which extrudes the material, is not constant for a variety of reasons, including that the weight of material in the hopper varies as material is withdrawn therefrom. This results in an extrusion having a non-uniform cross-section exiting the extruder and if a die is used to shape the extrusion, in turn, results in the extrusion leaving the die with a non-uniform cross-section.

As discussed below, because the extrusion is placed under a high tension during stretching or orientation, any non-uniformity in cross-section results in high stress areas within the extruded rod or strip which may result in the rod or strip breaking. Once the strip or rod extrusion breaks, the entire process must be stopped and many feet of expensive extrudate and time are wasted and these must be removed from the process line.

The process of the present invention solves this problem by placing a metering pump downstream of the extruder but prior to the die area. The metering pump has pressure transducers set to maintain the pressure into the pump and into the die area at constant predetermined pressure. By controlling the speed of the extruder screw sufficient material enters the metering pump and the die from the extruder. Laser micrometers downstream of the die are utilized to confirm that the cross-section is constant. The metering pump controls the speed of the extruder to maintain pre-set pressures at the pump input. Pressures are maintained by pressure transducers which send electrical signals to the controller unit of the pump which in turn controls the speed of the extruder. The laser micrometers may also be placed in a feedback loop to control the constancy of the rod or plate cross-section.

SUMMARY OF THE INVENTION

It is an object of the invention to provide a continuous process for forming bioresorbable plates, rods or bars having a constant cross-section and high strength and which retain their strength for a sufficient time after implantation for the intended use.

It is also an object of the invention to provide a continuous extrusion process for forming oriented thermoplastic extrusions of constant cross-section which can be cut into segments that may then be machined into screws, pins and plates for use as resorbable orthopedic implantable devices.

It is a further object of the invention to provide a continuous process for forming thermoplastic extrusions which extrudate can have its polymer chains oriented by stretching in a continuous process.

It is yet an additional object to provide a process for continuously forming bioabsorbable rods, strip, tape or bars made of a novel terpolymer of L-lactide, D-lactide and glycolide.

These and other objects of the present invention are accomplished by a process for forming an extrudate, such as a rod or strip of bioabsorbable polymeric material which includes continuously extruding thermoplastic material at a temperature above its melting point (normally between 125° C. and 250° C.) to form continuous rods, strips, tapes or bars having a tightly controlled cross-section. For polylactide, this temperature is preferably between 180° C. and 200° C. The extrusion takes place at rate of between 0.4 and 20 feet per minute. Once extruded, the extrudate enters a metering pump, which precisely controls the amount of material entering a die which shapes the extrudate. The die reduces the cross-section to a desired shape and consolidates the material. The extrudate is then cooled around its outer surface to form a skin such as by circumferentially blowing air around its outer skin. The extrudate is then passed through the cooling bath to cause nucleation. The cooling bath has a temperature of between 10° C. and 50° C. and may be composed of water or other liquid which does not react with the polymeric material being used.

The extrudate is then passed through a first puller downstream of the die with the first puller running at approximately the same speed as the extruder. The continuous extrudate then engages a second puller which is moving faster than the first puller so that the continuous extrudate is placed under tension. Intermediate the first and second pullers, the continuous extrudate is heated to a temperature above its glass transition temperature but below its melting point, which depending on the polymer, is between about 55° C. and about 200° C. and preferably between about 70° C. and about 200° C. and more preferably between about 70° C. and about 100° C. in an orientation bath or oven. The melting point of polylactide is around 200° C. but the melting point of the novel terpolymer is about 140° C. During orientation the temperature is kept above the glass transition temperature and preferably well below the melting temperature. The bath is preferably filled with boiling water at 100° C. or in an air oven such as an infrared oven. The polymer is oriented by elongation while heated by stretching or drawing the extrudate between the first and second pullers at an elongation ratio of between 2:1 and 12:1. After the extrudate is elongated, the continuous extrudate is then annealed, either at the end of the same bath or oven where it is heated for orientation or in a separate heating bath or oven at a temperature of between about 65° C. and about 110° C. and preferably between 70° C. and 100° C. Tension is maintained on the extrudate during annealing by locating the second puller downstream of the annealing station. Once the continuous extrudate passes downstream of the second puller, tension is completely released before the extrudate cools to ambient temperature of about 25° C. The extrudate then is continuously cut into sections of predetermined length for further processing such as into screws or pins.

Prior to extruding the thermoplastic raw material, which may be polyorthoesters, tyrosine derivatives, polydioxanone, trimethyl carbonate and alpha hydroxy polyesters such as L-lactide, D-lactide, copolymers of lactide (D-lactide, L-lactide or D/L-lactide) and glycolide or a terpolymer of L-lactide, D-lactide and glycolide or poly-4-hydroxy alkanaotes. One or more of these materials are placed in a hopper in granular form under an inert atmosphere such as a nitrogen, helium or argon atmosphere. Suitable lactides are disclosed in applicant's U.S. Pat. Nos. 4,539,981 and 4,550,449 the teachings of which are incorporated herein by reference. A novel terpolymer of L-lactide, D-lactide and glycolide is disclosed in applicant's co-pending application Ser. No. 09/263,268, filed Mar. 5, 1999, now U.S. Pat. No. 6,206,883, the teaching of which is incorporated herein by reference. Other polymers are alpha-hydroxy-alpha-ethylbutyric acid; alpha-hydroxy-beta-methylvaleric acid; alpha-hydroxyacetic acid; alpha-hydroxybutyric acid; alpha-hydroxycaporic acid; alpha-hydroxydecanoic acid; alpha-hydroxyheptanoic acid; alpha-hydroxyisobutyric acid; alpha-hydroxyisocaproic acid; alpha-hydroxyisovaleric acid; alpha-hydroxymyristic acid; alpha-hydroxyoctanoic acid; alpha-hydroxystearic acid; alpha-hydroxyvaleric acid; beta-butyrolactone; beta-propiolactide; gamma-butyrolactone; pivalolactone; or tetramethylglycolide or combinations thereof.

During orientation, the heating of the continuous extrudate is carried out in an oven containing either heated air or heated water at a temperature of about 100° C. After orientation by stretching, the extrudate is allowed to anneal for a predetermined time in an air or in a water bath at a temperature of between about 65° C. to about 100° C. and preferably closer to 90° C. The annealing can take place in the same oven or bath as the elongation, since the elongation may take place in the first part (first 12 inches) of the orientation oven depending on the process parameters. Total elongation in the first inches of the bath results in longer annealing time but results in a less uniform elongation from surface to core wherein elongation over several feet results in a more uniform elongation throughout the cross-section of the extrudate.

The process takes places in a continuous production line where the continuous extrudate is supported horizontally in a single plane as the process proceeds up until the cutting of segments thereof by a cutter located downstream of the second puller. Since the heating and cooling times of the continuous extrusion are dependent on its cross-sectional shape, certain minimum times in each process stage must be adhered to so that the core of the cross-section reaches the required temperature. The combined time for the entire process coupled with the process rate of between 0.4 and 2 feet per minute require a production line of about 50 feet or even longer.

These and other objects and advantages of the present invention will become apparent from the following description of the accompanying drawings. It is to be understood that the drawings are to be used for the purposes of illustration only and not as a definition of the invention.

DETAILED DESCRIPTION OF THE PREFERRED EMBODIMENTS

Figure 1:
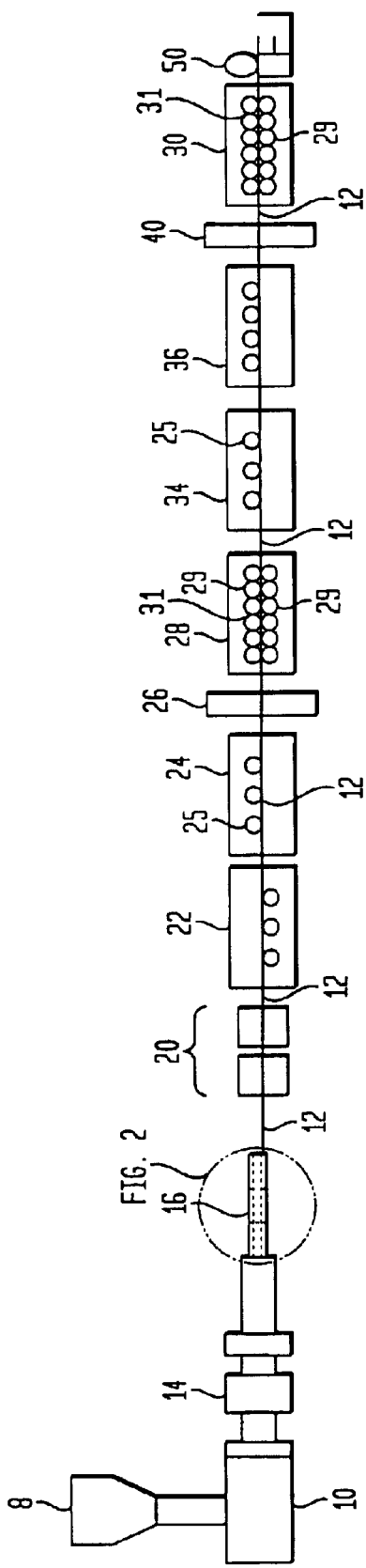
FIG. 1 is a block diagram illustrating the process of the present invention.

Referring to FIG. 1, there is shown an embodiment of the production process of the present invention, which includes an extruding step in which a resorbable thermoplastic polymer, such as polylactide, polyglycolide, copolymers of polylactide and polyglycolide and a terpolymer of L-polylactide, D-polylactide and glycolide in granular or pelletized form are fed from a hopper 8 into an extruder 10. Extruder 10 is an Olympus, 1.5 inch extruder. The output diameter of this extruder is 1.5 inches but larger or smaller extruders could be used depending on the desired final cross-section. The hopper and extruder are filled with an inert gas such as nitrogen, argon or helium to prevent oxygen and water vapor from contacting the melted polymer. Material degradation occurs if the thermoplastic contacts oxygen or moisture while melted. The extruder is heated to a temperature slightly higher than the melting point of the polymer being used usually between about 125° C. and about 250° C., depending on the polymer. Extruder 10 continuously extrudes an extrudate 12 of any desired cross-sectional shape, however, in the preferred embodiment the extrudate upon exiting extruder 10 is a rod having a nominal diameter of 1.5 inches. The preferred extruder is capable of developing an output of thermoplastic of at least 2800 psi pressure.

After exiting extruder 10, extrudate 12 enters a metering pump 14 which includes pressure transducers to maintain the pressure at the upstream pump entrance at a predetermined value. In the preferred embodiment, this value is 2800 psi. Such a metering pump is well known and may be purchased from Zenith Division of Parker Hannifin Corporation in Sanford, N.C. as model PEP-II with a 3 cc per revolution output. Metering pump 14 is required so that the cross-sectional shape of the extrusion can be made constant. If the cross-sectional shape is not maintained constant, then, as will be explained in greater detail below, the extrudate may break when placed under tension. Metering pump 14 utilizes pressure transducers to sense the pressure at the input to the pump and at the output to the die and maintains the pump input pressure at a preferred 2800 psi by a feedback control system which controls the speed of a variable speed extrusion drive motor (not shown). Thus, if the pressure starts to decrease at the pump input, the feedback control system speeds the rotation of the extruder screw drive shaft so that additional melted material enters the pump from the extruder, thereby maintaining the desired pressure. Without such a system, it is impossible to maintain the output of the extruder 10 constant because of material flowability and the varying amounts of material in the hopper 8.

Figure 2:
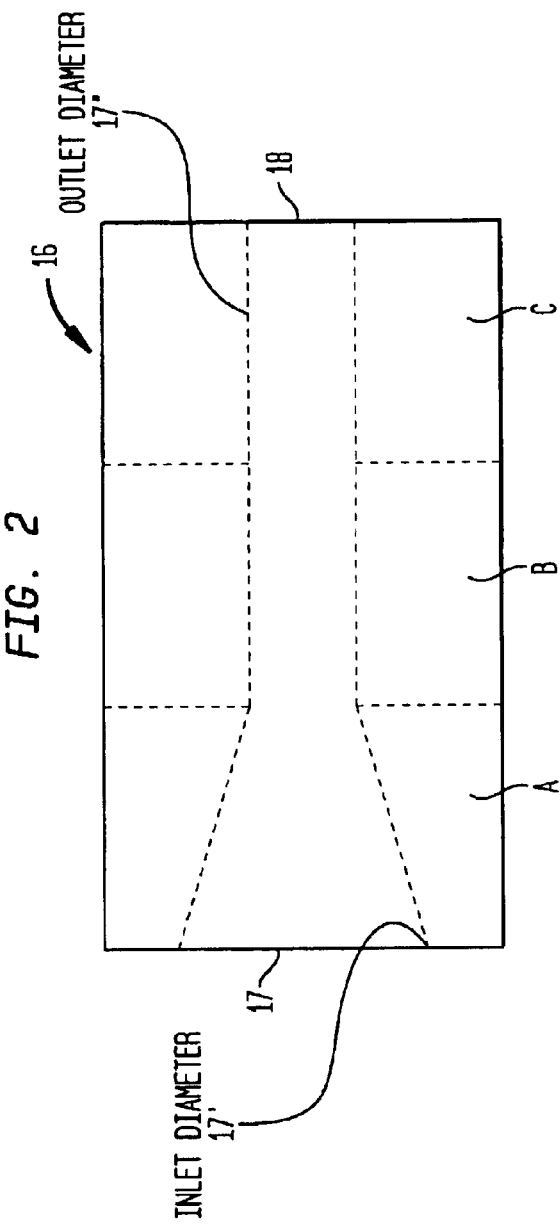
FIG. 2 is a cross-sectional view of the three section die used to form the extrudate of the present invention.

The metering pump 14 is connected to a die 16. The die 16 is preferably conical at the inlet side and shaped so that any reduction in the cross-sectional shape of the melted thermoplastic material is done gradually. Die 16 has an inlet 17 and a smaller outlet 18 with the inlet and outlet diameters 17' and 17" respectively in the preferred embodiment, being 1.5 inches (38.1 mm) and 1.2 inches (30.5 mm) respectively. In the preferred embodiment the conical section of the die from inlet diameter 17' to the outlet diameter at 17" extends about one third the length of the die with a constant output diameter 17" extends for about two thirds of the length of the die. In the preferred embodiment, the thermoplastic material temperature is controlled from the exit of the extruder 10 to the outlet 18 of die 16 by heating all of the components between the exit of the extruder and the exit 18 of die 16 to maintain the thermoplastic material at a temperature above its melting point, preferably between 180° C. and 195° C. If desired, die 16 can be composed of three or more zones, shown as A, B and C shown in FIG. 2, which zones are heated to different temperatures, gradually lowering the temperature as the thermoplastic extrudate passes from the entrance 17 to exit 18 of the die. For example, the zones can lower the temperature in 5° increments from 195° C. to 180° C. or can all be maintained at 180° C. The extruder, metering pump and die extend for about 8 to 10 feet in length.

Once leaving the exit 18 of die 16, the preferred extrudate or rod 12 may be pre-drawn in its semi-fluid state by running first puller 28 at a slightly higher speed that the rate of the material movement through die 16. Thus, the semi-fluid rod may easily be reduced from the output diameter of 30.5 mm to 17.5 mm by a combination of cooling, gravity and drawing prior to entering the air cooler 22 discussed below. Because the extrudate temperature is above the melting point the polymer elongation does not produce any orientation of the polymer chains.

After exiting die 16 and being drawn to a smaller diameter than the diameter of exit 17", the extrudate 12 enters an air wipe zone 20 in which air at room temperature is circulated around the outer surface of the extrudate, cooling the outer surface and thereby forming a skin around the outside of the polymer. This zone extends for about 6 to 12 inches and may be a combination of two air wipes each 3 to 6 inches in width. Air wipes are well known in the polymer extrusion art and surround the outer surface of the cross-section of the extruded polymer moving air therearound so that the extrudate circumference is cooled uniformly. If the outer surface is not cooled uniformly, the extrudate will bend along its length.

After exiting air wipe zone 20, extrudate 12 enters air cooler 22 which allows extrudate 12 to cool further in air at room temperature. The length air cooler 22 is preferably about between 4 and 5 feet and allows the rod outer surface to cool to room temperature.

In the preferred process, extrudate 12 leaves the air cooler 22 and immediately enters the nucleation water bath 24 which is held at a temperature between 10° C. and 50° C. preferably 20° C. In the preferred embodiment, for a rod 17.5 mm in diameter, the length of cold water bath 24 is between 4 and 6 feet and its temperature is 20° C.

Rollers 25 are used in the cold water bath to hold the extrudate 12 underwater. Thus, as shown in FIG. 1, the rollers are located above extrudate 12. The solidification of thermoplastic extrudate 12 provides sufficient support to maintain the extrudate horizontal. A similar system with rollers 25 located above extrudate 12 is utilized in the hot water orientation/annealing bath 34, 36 as discussed below. The cold water bath 24 causes nucleation (i.e. formation of small crystals in the body of the extrudate).

After exiting cold water bath 24, extrudate 12 enters a laser micrometer 26 which accurately measures the cross-sectional shape of extrudate 12 to determine whether it is within predefined dimensions, i.e. within 1% to 10% of the nominal 17.5 mm in the preferred embodiment. After extrudate 12 leaves cold water bath 24, the core is at about room temperature. In one embodiment of the process, the output from the laser micrometer may be utilized by the feedback control system which uses a commercially available microprocessing control system connected to the metering pump to sense the rod shape and to vary the pressure at which the extrudate is being fed from the pump into the die stage. This is done by controlling the speed of the variable speed extruder motor which itself is also controlled by the control mechanism of the pump. The laser micrometer may also be used to control the speed of the puller 28 which may be varied to make small adjustments in the draw ratio of the drawing taking place immediately after die 16 and thus the diameter of the extrudate. This feedback system is capable of controlling the cross-section constant to within 10% or less and preferably within 1% of nominal. The microprocessor controls the amperage to the motor to maintain the 2800 psi to within ±10 psi.

After exiting laser micrometer 26, the extrudate enters the first puller 28, which is of a length sufficient to generate enough force on the extrudate 12 to resist the tension developed by a second puller 30 located downstream of first puller 28 which second puller 30 runs at a higher speed than first puller 28. In the preferred embodiment, the length of first puller 28 is approximately 3 feet with six pairs of opposed rollers 29 turning at a predetermined speed. First puller 28 may be composed of two identical belt pullers each with six pairs of rollers (upper and lower) placed side by side. The rollers drive rubber belts 31 which contact the extrudate 12 from above and below. The speed at which the rollers 29 in first puller 28 turn may be at the speed of the extrusion at the exit of metering pump 14 so that extrudate 12 is not placed under any tension prior to exiting first puller 28, alternately, the speed of rollers 29 may be higher so the rod 12 is elongated and reduced in diameter to a desired lower diameter which then enters the cooling area and puller 28. Upon exiting first puller 28, extrudate 12 then enters a hot water bath 34 containing water at between 70° C. and the boiling point (100° C.). Hot water bath 34 is where orientation (by elongation) and annealing occurs which may be done in one continuous bath preferably filled with boiling water or may be done in two baths with the second bath 36 at a different temperature than bath 34. If two separate baths 34, 36 are used a temperature of about 90° C. in annealing bath 36 is preferred. Baths 34, 36 could also be air or inert gas filled convection ovens at the stated or higher temperatures. Use of an air or inert gas oven requires somewhat higher temperature (140° C.–200° C.) since it takes longer for the polymer core to heat up in air than in water. In any event, the core must be heated to between the polymer glass transition temperature and the melting point of the polymer.

Downstream of hot water baths 34, 36 is second puller 30 running at a higher speed than first puller 28 to thereby put the extrudate under tension. Assuming the first puller 28 is running at the same speed of extruder 10, the speed differential between second puller 30 and first puller 28 may be a factor of between 2 and 12 which results in an elongation of extrudate 12 of between 2 and 12 times. Due to slippage, it has been found necessary to run the second puller 30 at a slightly higher speed than the desired draw ratio suggests. For example, to obtain a draw ratio of about 5, the speed ratio between the second and first puller should be about 5.2. Upon elongation a corresponding reduction in the cross-sectional area also occurs. The reduction in diameter for a given draw ratio can be easily calculated by assuming the volume of material is constant for a given length.

Thus at the preferred ratio of about 5 or above a final rod diameter of about 6 to 8 mm and preferably about 7.5 mm results. The elongation orients the polymer chains generally in parallel. The tension in extrudate 12 between the first and second pullers may be between 600 and 1000 pounds. Consequently, care must be taken to insure that there are sufficient opposing rollers 29 in the first puller 28 to prevent extrudate 12 from excessive slipping. In the preferred embodiment first puller 28 is composed of two 36 inch long units each having four to six pairs of rollers four (4) inches in diameter, each group of these rollers (upper and lower) of the pairs each drive a continuous rubber belt which contacts the surface of extrudate 12 throughout the length of puller 28. The upper and lower belts of the first puller 28 are driven respectively by the opposing upper and lower rollers of each pair of rollers are spaced somewhat less than the thickness of extrudate 12 upon exiting the nucleation bath so that sufficient pressure is generated to prevent slipping. The pairs of rollers are designed so that the spacing between the upper and lower rollers of each pair is adjustable. The spacing is adjusted to that sufficient pressure is placed on the extrudate 12 by each pair of rollers to prevent excessive slippage.

In the preferred embodiment, hot water bath 34 and 36 extends for between 10 and 11 feet with the elongation taking place within the first foot to ten feet of the bath. The remaining length of the bath allows the now elongated extrudate 12 to anneal. Immediately after hot water bath 34, 36 is a second laser micrometer 40 which checks the dimensions of the extrudate cross-section. The second puller is located immediately after this laser micrometer. Again, the feedback control system can include the second micrometer 40 to enhance the control of the cross-section along the process line.

As stated, the annealing can take place in a separate air or inert gas oven or water bath 36, which can be at a temperature different than hot water bath 34 where the orientation by stretching occurs. Bath 36 can be at a somewhat lower temperature than the boiling point of water preferably between 65° C. and 90° C. and more preferably at about 90° C. The annealing takes place for about 20 minutes and serves to crystallize the polymer. The advantage of using a lower anneal temperature than the orientation temperature is that shrinkage, which normally occurs when the rod is heated in the operating room for forming the rod or other extrudate to anatomical conditions, is much lower. However, the lower the temperature used in annealing bath the longer the time necessary to obtain the same crystalinity. Thus, the annealing bath must be longer if the temperature of the bath is lowered. This second bath can be an air oven instead.

Second puller 30 is approximately 30 to 72 inches long again with two rubber upper and lower belts on each group of three four inch rollers. Upon exiting this puller and prior to cooling, tension is released and extrudate 12 is then immediately cut at cutter 50 to the desired length of preferably between ⅓ and 3 meters. Cutter 50 may be in the form of a circular or reciprocating saw or cutting blade.

If the extrudate is in the form of a 7.5 mm diameter rod, a 3 meter or longer length may be used for insertion into an automatic screw machine for forming screws of the bioabosorbable polymer. Such machines are well-known for manufacturing metal screws. Of course, the rod could be cut into any desired length as long as it is supported horizontally prior to cutting. This is because extrudate 12 cools to room temperature only after being cut, since the cutter is located immediately after the second puller.

By eliminating the tension on the rod prior to its cooling to room temperature, the normal shrinkage of the material is further reduced when the material is later heated, either for sterilization purposes or in the operating room to deform a bioabsorbable plate or rod to conform to anatomical conditions. Deforming thermoplastic plates when heated to match anatomic contours is quite common since thermoplastics retain their deformed shape when cooled.

EXAMPLE 1

Draw Ratio 1 (Control)

Hopper 8 was filled with granulated terpolymer of D-lactide, L-lactide and glycolide (5%, 85% and 10%) with the granules being between 2 and 3 mm in size. The material is purged of air by the use of inert gases such as nitrogen, argon and helium at a pressure of 1 or 2 psi above atmosphere. The material was fed into the extruder 10 and heated to above its melting temperature to between 205° C. and 230° C. The extruder 10 was also purged with nitrogen or other insert gas at a higher than atmospheric pressure to prevent oxygen from combining with the melted thermoplastic. The extruder included a 1½ inch diameter screw driven by a variable speed motor with its output fed into a metering pump at 2800 psi which pressure was maintained to the output into the die 16 which was also at 2800 psi. The output of the metering pump 14 is about 0.4 feet per minute, with the metering pump having a controller for controlling the speed of the extruder motor via a pressure transducer sensing any variation in the 2800 psi pressure. Once the pressure fell about 10 psi a controller increased the speed of the extruder motor. The inlet opening of the die was 1.5 inches which tapers conically to a diameter of 1.2 inches (30.5 mm) so that a circular rod of 1.2 inches (30.5 mm) in diameter was formed. Immediately after leaving the die and while above its melting temperature, the still semi-fluid the rod was drawn to a diameter of 17.5 mm. The rod was then passed through the air wipe stage 20 in which a skin was formed on the outside of the rod by the blowing of room temperature air at an elevated pressure of 21 psi around the entire outer circumference of the rod in a circular motion. The air wipe cooling stage uses air at room temperature for about one minute to cool the rod and immediately feeds the rod into an air cooling section of about 54 inches where the rod travels in air over a series of teflon pulleys. The rod then moves into a nucleation bath of water which was at a temperature of between 20° C.–25° C. which was also about 54 inches long and has pulleys located above the rod to keep the rod submerged. This cooled the center of the rod to about 22° C. to 23° C. Upon exiting the cooling bath, a laser micrometer checked to see whether the diameter was correct within 1% of the 17–18 mm (17.5 preferred) nominal. Variations in diameter of between 1% and 10% are acceptable, however, variations greater than 10% result in rod breakage during the process due to tension. If the diameter was incorrect, the laser micrometer adjusted the speed of the extruder. Upon exiting the micrometer, the rod entered the first puller 28 which includes two separate 36 inch pullers in series each with 36" belts driven by six pairs of opposed rollers of 4 inch diameter. Each group (upper and lower) of six rollers drive belts extending along the 36 inch length of each puller for a total of 72 inches. The extruded rod entered an orientation bath which was 90° C.–100° C. but was not stretched in this control (non-oriented) sample, i.e. the second puller 30 downstream of the orientation bath was run as the same speed of first puller 28. Upon exiting the second puller 30, the rod was cut into 18 inch lengths at cutting station 50.

EXAMPLE 2

Draw Ratio 5.5

The same process was used as in Example 1 except that now the second puller 30, was operated at a much higher speed (5.7 times the speed of puller 28) so that a tension was placed on the rod between the first and second pullers to elongate the rod 5.5 times. It has been found that the speed ratio must be slightly higher than the actual draw ratio due to slippage of the rod between the rollers in the second puller. The orientation/annealing bath extended for about 128 inches and contained boiling water. The tension generated between the first puller 28 and second puller 30 elongated and oriented the polymer in the first 6 to 12 inches of the bath and the material was annealed during the remaining time in the bath. The rod was reduced from 17.5 mm in diameter to 7.7 mm in diameter after elongation in the orientation bath. After exiting the orientation/annealing bath, the rod was tested for correct outer diameter by a second laser micrometer. Upon exiting the second puller 30, the rod was cut into 18 inch lengths at cutting station 50.

The following table lists various test results of the material made in the above Example 1 (non-oriented) when compared to a rod made by the process of Example 2 (oriented). Test Data (extruded rod 7.7 mm in diameter)

|  | Unoriented (Example 1) | Oriented (Example 2) |
| --- | --- | --- |
| Tensile Strength | 76 MPa | 232.5 MPa |
| Bending Strength | 119.2 MPa | 186.1 MPa |
| Shear Strength | 56.3 MPa | 146.5 MPa |
| Modulus (tensile) Strength | 3672 MPa | 7299 MPa |
| Bending Modulus Strength | 3610 MPa | 6865 MPa |
| Torsion Strength | 331 N-mm | 836 N-mm |

EXAMPLE 3

Draw Ratio 2

Extrusions of a rectangular strip or ribbon profile were made of the same material as Example 1. The initial strip cross-section was 19.1 mm wide and 3.9 mm thick. The draw ratio between pullers 28 and 30 was equal to 2. The hot water bath 34, 36 was 190° F. Puller 28 was run at 2 feet per minute and puller 30 was run at 4 feet per minute. Test results: Flexure strength =107 MPa and bending modulus 3344 MPa.

EXAMPLE 4

Extrusions of the same rectangular strip or ribbon were made as in Example 3.

The draw ratio was 6. The hot water bath was 200° F. Puller 28 ran at 2.0 feet per minute; puller 30 ran at 12 feet per minute. Over the entire process, the strip width went from 19.1 mm to 9.7 mm and strip thickness went from 3.9 mm to 1.1 mm. The volume for a given length must be constant, thus:

V.=19.1×3.9×Length before elongation (l)=9.7×1.1× Length after elongation ($l_2$)

$$l_2 = \frac{19.1 \times 3.9 \times 1}{9.7 \times 1.1} = 6.98 \text{ overall draw ratio}$$

Test results: Bending modulus=10064 MPa and flexure strength=257.7 MPa.

It can be seen that the process of Example 4 produces a higher strength strip or ribbon.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A continuous process for forming a thermoplastic polymer extrudate having a predetermined cross-section, comprising:

extruding the extrudate at a controlled rate from an extruder at a temperature above its melting point and forming said cross-section;

cooling the extrudate by passing the extrudate through a cooling bath to cool the core of the cross-section to below the glass transition temperature of the thermoplastic polymer;

passing the extrudate through a first puller driven at a controlled speed;

passing the extrudate through a second puller driven at a faster speed than the first puller to put the extrusion in tension between said first and second pullers;

heating the extrudate between said first and second pullers; and releasing the tension on the extrudate after said second puller and prior to allowing the extrudate to cool to room temperature.

2. The process as set forth in claim 1 further including the step of passing the extrudate through a die for forming said cross-section.

3. The process as set forth in claim 2 further including the step of measuring the cross-section of said extrudate after exiting said die.

4. The process as set forth in claim 1 further including the step of controlling the extrusion rate of the thermoplastic polymer from the extruder by using a metering pump and a feedback system sensing the input pressure to the metering pump and using the sensed input pressure to control the speed of a variable speed extruder drive system to maintain the input pressure.

5. The process as set forth in claim 4 wherein the metering pump controls the rate of polymer flow into a die.

6. The process as set forth in claim 5 further including the step of measuring the cross-section of said extrudate after exiting said die.

7. The process as set forth in claim 4 wherein the extrudate is formed at a rate of between about 0.4 and 20.0 feet per minute.

8. The process as set forth in claim 4 wherein the input pressure is maintained at 2800±10 psi.

9. The process as set forth in claim 1 wherein said polymer is heated to between about 125° C. and 250° C. prior to extrusion.

10. The process as set forth in claim 9 wherein the polymer is heated to between 180° C. and 200° C. prior to extrusion.

11. The process as set forth in claim 1 wherein said cooling bath contains water at a temperature between 10° C. and 50° C.

12. The process as set forth in claim 1 wherein the extrudate is heated between said first and second pullers to a temperature of between about 55° C. and 140° C. allowing said extrudate to elongate under said tension.

13. The process as set forth in claim 12 wherein the elongation is done in a heated water bath.

14. The process as set forth in claim 12 wherein the elongation is done in an air or inert gas filled oven.

15. The process as set forth in claim 12 wherein said polymer is annealed at a temperature of between about 70° C. and 100° C. after said elongation.

16. The process as set forth in claim 15 where the annealing is done for at least twenty minutes.

17. The process as set forth in claim 15 wherein said annealing is done in an air or inert gas filled oven.

18. The process as set forth in claim 15 wherein said annealing takes place in a water bath.

19. The process as set forth in claim 12 wherein said extrudate is elongated at a ratio of between 2:1 and 12:1 while heated between said first and second pullers.

20. The process as set forth in claim 1 wherein the extrusion is maintained in a single generally horizontal plane for the entire process.

21. The process as set forth in claim 20 wherein the extrusion is maintained in single generally horizontal and vertical planes for the entire process.

22. The process as set forth in claim 1 wherein the polymer is selected from the group consisting of alpha-hydroxy polyesters, polydioxanone, polyorthoesters, tyrosine derivatives, trimethyl carbonate and a combination thereof.

23. The process as set forth in claim 1 wherein the polymer is a terpolymer having random repeating units of L-lactide, D-lactide and glycolide.

24. The process as set forth in claim 1 wherein the polymer is selected from the group consisting of L-lactide, glycolide, D/L lactide, D-lactide and a combination thereof.

25. The process as set forth in claim 1 wherein said heating of said extrudate is done in an air oven at between about 70° C. and the melting point of the polymer.

26. The process as set forth in claim 1 wherein said heating of said extrudate is done in an air oven at between about 70° C. and 200° C.

27. The process as set forth in claim 1 wherein the extrudate is heated between said first and second pullers to a temperature of between about 70° C. and the melting point of the polymer.

28. The process as set forth in claim 1 wherein the extrudate is heated between said first and second pullers to a temperature of between about 70° C. and 200° C. allowing said extrudate to elongate under said tension.

29. A continuous process for forming a thermoplastic polymer extrudate having a predetermined cross-section comprising:

extruding the extrudate from an extruder at a temperature above its melting point and forming said cross-section;

cooling the extrudate by passing the extrudate through a cooling bath to cool the core of the cross-section to below the glass transition temperature of the thermoplastic polymer;

passing the extrudate through a first puller driven at a controlled speed;

passing the extrudate through a second puller driven at a faster speed than the first puller to put the extrusion in tension between said first and second pullers;

heating the extrudate between said first and second pullers; and releasing the tension on the extrudate after said second puller and prior to allowing the extrudate to cool to room temperature.

30. The process as set forth in claim 29 further including the step of controlling the extrusion rate of the thermoplastic polymer from the extruder by using a metering pump and a feedback system sensing the extrudate input pressure to the metering pump and using said sensed input pressure to control the speed of a variable speed extruder drive system to maintain the input pressure.

31. The process as set forth in claim 30 wherein the input pressure is maintained at 2800±10 psi.

32. The process as set forth in claim 29 wherein said polymer is heated to between about 125° C. and 200° C. prior to extrusion.

33. The process as set forth in claim 32 wherein the polymer is heated to between about 180° C. and 200° C. prior to extrusion.

34. The process as set forth in claim 29 wherein said cooling bath contains water at a temperature between 10° C. and 50° C.

35. The process as set forth in claim 29 wherein the extrudate is heated between said first and second pullers to a temperature of between about 55° C. and 140° C. allowing said extrudate to elongate under said tension.

36. The process as set forth in claim 35 wherein the elongation is done in a heated water bath.

37. The process as set forth in claim 35 wherein the elongation is done in an air or inert gas filled oven.

38. The process as set forth in claim 35 wherein said polymer is annealed at a temperature of between about 70° C. and 100° C. after said elongation.

39. The process as set forth in claim 38 wherein the annealing is done for at least twenty minutes.

40. The process as set forth in claim 38 wherein said annealing is done in an air or inert gas filled oven.

41. The process as set forth in claim 38 wherein said annealing takes place in a water bath.

42. The process as set forth in claim 29 wherein the polymer is selected from the group consisting of polyorthoester, tyrosine derivatives, polydioxanone, trimethyl carbonate, alpha hydroxy polyesters, alpha-hydroxy-alpha-ethylbutyric acid; alpha-hydroxy-beta-methylvaleric acid; alpha-hydroxyacetic acid; alpha-hydroxybutyric acid;

alpha-hydroxycaporic acid; alpha-hydroxydecanoic acid; alpha-hydroxyheptanoic acid; alpha-hydroxyisobutyric acid; alpha-hydroxyisocaproic acid; alpha-hydroxyisovaleric acid; alpha-hydroxymyristic acid; alpha-hydroxyoctanoic acid; alpha-hydroxystearic acid; alpha-hydroxyvaleric acid; beta-butyrolactone; beta-propiolactide; gamma-butyrolactone; pivalolactone; or tetramethylglycolide or combinations thereof.

* * * * *